Sept. 29, 1970    R. B. WALLACE    3,530,704
COMPASS COMPENSATION

Filed May 29, 1967    2 Sheets-Sheet 1

INVENTOR
RICHARD B. WALLACE
BY Whittemore, Hulbert
& Belknap
ATTORNEY

Sept. 29, 1970   R. B. WALLACE   3,530,704
COMPASS COMPENSATION

Filed May 29, 1967   2 Sheets-Sheet 2

INVENTOR
RICHARD B. WALLACE
BY Whittemor, Hulbert
& Belknap
ATTORNEYS

United States Patent Office 3,530,704
Patented Sept. 29, 1970

3,530,704
COMPASS COMPENSATION
Richard B. Wallace, Bloomfield Hills, Mich., assignor to The Oakland Corporation, Troy, Mich., a corporation of Michigan
Continuation-in-part of application Ser. No. 476,343, Aug. 2, 1965. This application May 29, 1967, Ser. No. 641,959
The portion of the term of the patent subsequent to Dec. 31, 1985, has been disclaimed
Int. Cl. G01c 17/38
U.S. Cl. 73—1                                    11 Claims

ABSTRACT OF THE DISCLOSURE

A magnetic compass on a vessel or other vehicle is compensated against semi-circular deviation due to a disturbing magnetic field of the vessel by maintaining the vessel on a single heading and separately and sequentially neutralizing the effect of the earth's magnetic field and the effect of the local disturbing magnetic field on the compass, and thereafter restoring the effectiveness of the earth's magnetic field on the compass.

CROSS-REFERENCE TO RELATED APPLICATION

This is a continuation-in-part of my prior copending application Ser. No. 476,343, filed Aug. 2, 1965, now patent No. 3,418,840.

SUMMARY OF THE INVENTION

In accordance with the present invention a magnetic compass on a vehicle such for example as a boat or other vessel, an aircraft or the like, is first removed from the vehicle to a point where it is subjected only to the influence of the earth's magnetic field. At this point it is given an orientation identical with the orientation which it has on the vehicle. Thereafter, by adjustment of suitable magnetic compensating means, the earth's magnetic field is neutralized so that the compass needle or magnet remains in any position to which it is moved. Thereafter, the compass with the compensating means remaining adjusted relative thereto is returned to the vehicle and reoriented into its original position. At this time it will be subject to the disturbing influence of the magnetic field of the vehicle and the compass needle or magnet will accordingly assume a position in parallelism with the vehicle's magnetic field. Thereafter, by a separate magnetic compensating means adapted to remain in permanent adjustment relative to the compass, the magnetic field of the vehicle is neutralized by suitable adjustment of the separate magnetic compensating means. Again, this condition exists when the compass needle or magnet may be moved to any position and remains in such position.

Finally, the first mentioned magnetic compensating means is removed from the compass, leaving the compass responsive only to the earth's magnetic field.

Compensation may be limited to compensation of horizontal components of the magnetic fields or it may be a complete compensation taking into account vertical components of the magnetic fields.

It is accordingly an object of the present invention to provide means for effecting complete compensation of a magnetic compass against semi-circular deviation attributable to the presence of permanently or semi-permanently magnetized bodies on the vehicle by first eliminating the effectiveness of the earth's magnetic field, thereafter neutralizing the magnetic field of the vehicle due to permanent or semi-permanent magnetization of a body or bodies thereon by appropriate adjustment of magnetic compensating means, and finally, restoring the effectiveness of the earth's magnetic field so that the compass needle or magnet is fully compensated against semi-circular deviation.

It is a further object of the present invention to provide a method and apparatus for compass compensation characterized in that the vessel remains on a single heading, thus eliminating the usual requirement for placing the vessel on a number of different headings during compensation.

It is a further object of the present invention to provide a device for compass compensation comprising support structure for temporary connection to a compass, sighting means on the device, and adjustable compass compensating means on the device.

It is a further object of the present invention to provide a device as described in the two preceding paragraphs in which the compass compensating means comprises a magnet support rotatable about a vertical axis and is vertically adjustable.

It is a further object of the present invention to provide a novel method of compensating the magnetic compass to eliminate any disturbing magnetic influence resulting from at least semi-permanently magnetized structure adjacent the magnet in a vehicle or the like.

It is a further object of the present invention to provide a method as described in the preceding paragraph which comprises the step of first eliminating the effect of the earth's magnetic field and thereafter neutralizing the remaining magnetic field which is attributable to the disturbing magnetic influence of structure surrounding the magnet in a vehicle or the like.

It is a further object of the present invention to provide a method of compensating a magnetic compass against disturbing magnetic influences attributable to structure surrounding the compass at its point of use in a vehicle or the like, which comprises removing the compass to a location in which it is subjected solely to the earth's magnetic field, orienting the compass to the orientation it had on the vehicle, neutralizing at least the horizontal component of the earth's amgnetic field, restoring the compass with the earth's magnetic field still neutralized to its location of use and original orientation on the vehicle, thereafter neutralizing the horizontal component of the magnetic field attributable to structure on the vehicle, and finally, terminating neutralization of the earth's magnetic field, leaving the compass subject only to the influence of the earth's magnetic field.

It is a further object of the present invention to provide a method for compensating a magnetic compass on a vehicle or the like which comprises placing the vehicle on or near a cardinal heading if necessary, connecting a compensating and sighting device to the compass on the vehicle, sighting a distant object therewith to establish its orientation or actual magnetic heading, removing the compass wth the device attached thereto from the vehicle to an area in which it is subject solely to the earth's magnetic field, again sighting with the device to orient the compass in substantial alignment with its original orientation, adjusting magnetic means of the device to neutralize at least the horizontal component of the earth's magnetic field, restoring the compass and the device to the vehicle, sighting with the device to restore the compass to its original axis of orientation, adjusting a second magnetic compensating means to eliminate at least all remaining horizontally acting magnetic influence on the compass, thereby in effect neutralizing at least the horizontal component of any disturbing magnetic influence attributable to structure on the vehicle, and finally removing the combined sighting and compensating device, leaving the compass compensated for disturbing magnetic influences attributable to structure on the vehicle and subject solely to the earth's magnetic field.

It is a further object of the present invention to provide a method and apparatus which takes into account vertical field components, so that full compensation is provided.

Other objects and features of the invention will become apparent as the description proceeds, especially when taken in conjunction with the accompanying drawings, illustrating preferred embodiment of the invention.

DESCRIPTION OF THE PREFERRED EMBODIMENTS

Figure 1:
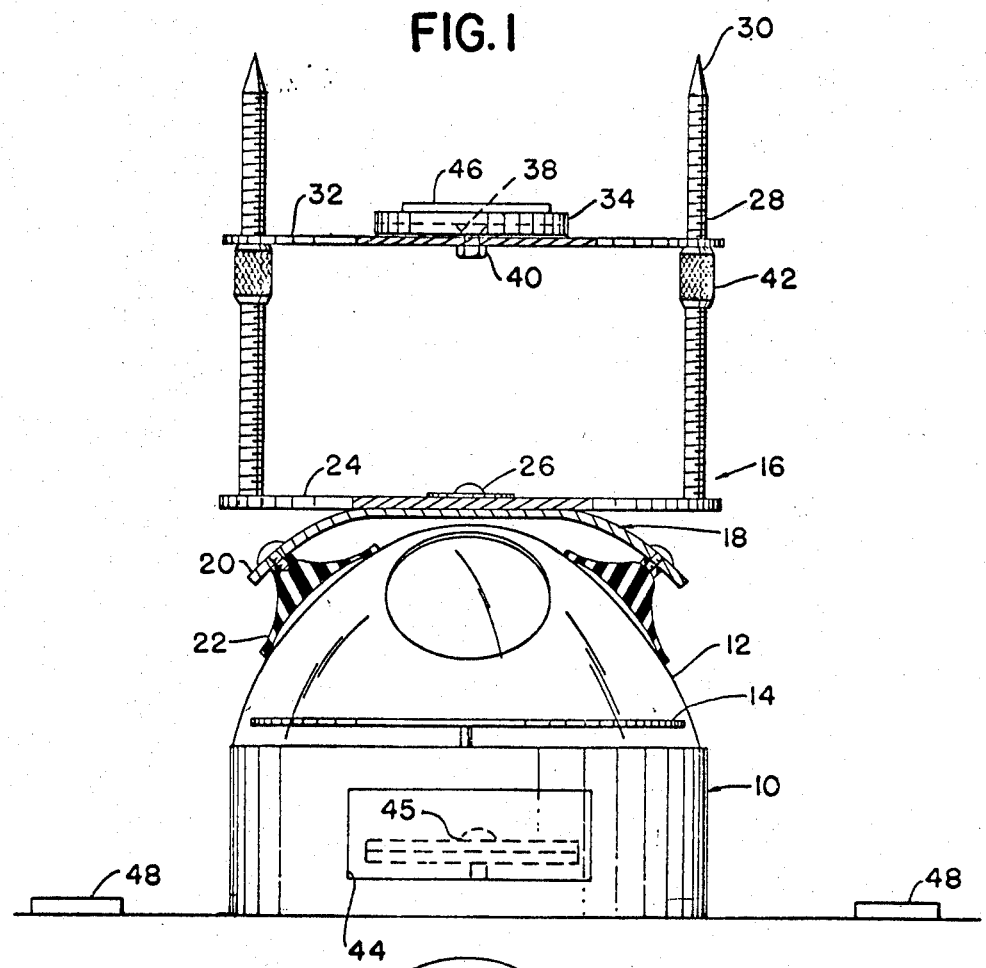
FIG. 1 is an elevational view of a magnetic compass to which the combined sighting and compass compensating means is attached, partly in section on the line 1—1, FIG. 2.

The present invention relates to compass compensation, and more particularly to a method and apparatus for eliminating compass error due to local magnetic disturbances of permanent nature.

The simplified method and apparatus is not intended to compensate for quadrantal deviation, and if the vehicle is one in which quadrantal compass deviation appears, the vehicle is first put on or near a cardinal heading so that quadrantal deviation is eliminated or reduced to a value which may be ignored. The deviation which is eliminated by the present method and apparatus is that due to permanent or semi-permanent polarization of an iron structure on the vehicle, such as the engines or machinery on a vessel.

In accordance with the present invention the orientation in space of a compass on a vehicle, such as a boat, aircraft, or the like is noted, the compass removed from the source of the local magnetic disturbances to an area where it is subjected only to the influence of the earth's magnetic field, and is there oriented as on the vehicle. At this time, and while it is subjected only to the earth's magnetic field, the magnetic field, or at least its horizontal component is effectively neutralized by adjustment of suitable magnetic compensating means so that the compass needle or magnet is free to turn or to remain in any position. Thereafter, the compass is returned to the vehicle and mounted with its original orientation. At this time the compass magnet is therefore subjected solely to the disturbing magnetic influence of the vehicle, while the magnetic means which neutralizes the earth's magnetic field remains in its adjusted position, second magnetic means are adjusted to neutralize the disturbing magnetic influence attributable to the vehicle. This is accomplished when the compass magnet or needle is again free to turn in any direction and to remain in any position to which it is led, as by moving a small magnet adjacent the compass.

Thereafter, the first magnetic means which neutralized the earth's magnetic field is removed, leaving the compass subject only to a magnetic compensating means effective to neutralize the disturbing magnetic influence of the vehicle.

The present invention is based upon the fact that a magnetic compass positioned on a vehicle such for example as a boat, aircraft, or the like, is subjected to a magnetic influence which may be resolved into two major components, the earth's field and the resultant of all other local permanent or semi-permanent disturbances which hereinafter will be referred to as the local field. If the earth's magnetic field could be "shut off" or neutralized temporarily, the compass would of course point solely in accordance with the orientation of the poles of the local field. This local field could then be dealt with directly and with no confusing involvement with the earth's magnetic field. The compass would in fact, be a precise indicator of the angle and polarity of the local field. In the first two embodiments of the present invention, concern is only with horizontal components of magnetic fields, and the following description should be understood accordingly.

The first step therefore is to "shut off" the earth's magnetic field. Obviously, the presence of the local field would involve itself so that the first step is carried out by removing the compass from the vehicle to a point as nearly as possible free from metallic objects. It is necessary to keep the same angular position or orientation of the compass which it will have when restored to the vehicle.

Figures 2, 3:
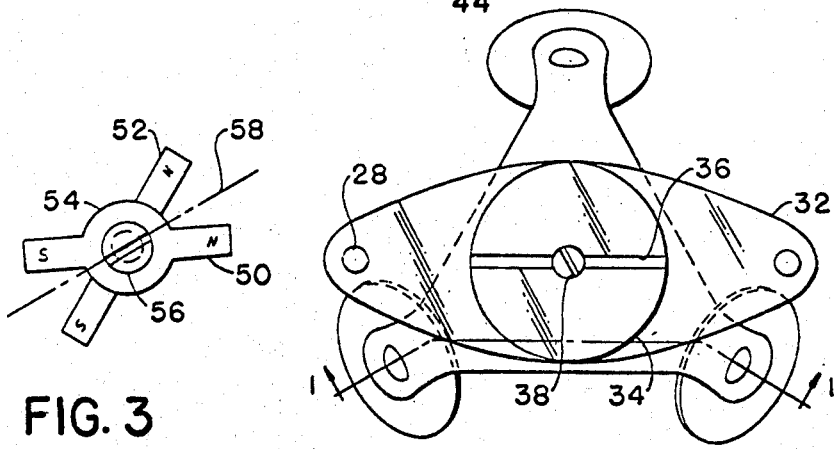
FIG. 2 is a plan view of the sighting and compass compensating device removed from the compass.
FIG. 3 is a diagrammatic plan view of a suitable built-in compass compensator.

In order to accomplish this the compass which is illustrated as comprising a base 10, a transparent bowl or cover 12, and a rotatable magnetically influenced indicator 14, has temporarily attached thereto a combined orientation and compass compensating device indicated generally at 16. This device comprises a support 18 having inclined legs 20 each of which carries a suction cup 22. The support 18 may conveniently be a lead stamping so that the legs 20 are bendable to conform to different bowl shapes. Connected to the support 18 is an angularly adjustable plate 24 which is connected to the support 18 by a pivot mounting 26. As best seen in FIG. 2, the plate 24 is elongated and adjacent its opposite ends it is provided with a pair of threaded posts 28 having pointed ends 30. Vertically adjustable on the posts 28 is an elongated platform 32 to the central portion of which is mounted a rotatable disc 34 having an elongated magnet receiving slot 36. The disc 34 is mounted for rotation by means of a countersunk screw 38 threaded into the platform 32 or extending through the platform and connected to a nut 40. The vertical spacing of the platform above the compass base 10 is adjusted by knurled nuts 42 threaded to the posts 28.

In the present case it is assumed that magnetic compensating means are provided in the base 10 of the compass to which access may be had through a door indicated at 44. Such adjustable magnetic means is indicated diagrammatically at 45. A suitable magnetic means will subsequently be described and it is sufficient to note at this time that the principal requirement is that it be adjustable about a vertical axis and that it also be adjustable as to its strength.

In order to carry out the present invention the rotatable plate 24 is adjusted about the vertical axis of the pivot 26 to align the points 30 of the posts 28 with some distant object. During this operation the vehicle will be retained against angular displacement, and if subject to quadrantal deviation, will be placed on or near a cardinal heading (magnetic). At this time the compass, with the device 16 firmly attached thereto, is removed from the vehicle and taken to a place where it is as nearly as possible subject only to the earth's magnetic field, and is then re-oriented into substantial alignment with the axis of orientation determined before its removal from the vehicle using the aiming points 30 for this purpose. In effecting this orientation it is desirable to maintain an accuracy of one degree and certainly not exceeding two degrees with reference to the original orientation of the compass. If the aiming point is not sufficiently remote, it will be necessary to make a correction for lateral displacement of the compass from the line of sight.

If the complete compass shown at 10 in FIG. 1, including the built-in compass compensating means 45 is provided, the effectiveness of the compensating means 45 is eliminated by one means or another. For example, the individually adjustable magnets making up the magnetic means 45 may be removed or may be moved into an inoperative position as will subsequently be described. Alternatively of course, the compensating magnets which are permanently associated with the compass during its normal usage may be in a binnacle or compass support from which the compass proper is removed when it is taken to the location in which it is subject solely to the earth's magnetic field.

The rotatable magnetic element 14 of the compass will at this time align itself with the horizontal component of the earth's magnetic field uninfluenced by any local disturbance attributable to the local magnetic field of the vehicle. The disc 34 is now rotated so that the slot 36 is in alignment with the earth's magnetic field and a bar magnet 46 with its polarity reversed to the earth's magnetic field is positioned in the slot 36. The platform 32 is now raised or lowered as required to a position in which the bar magnet received in the slot 36 is effective substantially to neutralize the horizontal component of the earth's magnetic field. When the bar magnet 46 has moved into the position which neutralizes the horizontal component of the earth's magnetic field, the rotatable magnetic element 14 may be moved to any position, as for example by temporary application of a small magnet adjacent its edge portion, and when the small magnet is removed the magnetic element 14 will remain in whatever position to which it was moved.

Without disturbing the connection between the device 16, the adjustment of the platform 32 or adjustment of the disc 34, the compass is now restored to its operating position aboard the vehicle and is again oriented in its original position by aligning the points 30 with the distant object previously noted. Restoring the compass to the vehicle of course subjects it to the local field of the vehicle so that the compass needle or the rotatable magnetic element 14 will align itself with the local magnetic field.

At this time the compass is again compensated by appropriate adjustment of a second magnetic compensating means. The requirement for this additional magnetic compensating means is that it be adjustable about a vertical axis and that it be adjustable as to strength. If the compass base is not provided with built-in compensating means fulfilling these requirements, the compensating may be by exterior magnets such as illustrated at 48, which may be positioned at opposite sides of the compass to produce a field at the device 14 in alignment and opposition to the direction of the local magnetic field. If it happens that support surfaces for the magnets 48 are not available where the magnets should be placed it will be possible to produce an artificial distortion of the local magnetic field by positioning additional magnetic means so as to cause the resultant local magnetic field to swing the compass card to a position such that supports are available for the magnets 48. Obviously, the second magnetic compensating means comprising the magnets 48, is adjustable about the vertical axis of the compass base 10 simply by positioning both of the magnets in different angular positions with reference to the compass at diametrically opposite sides thereof.

However, it is preferable to provide the second magnetic compensating means as an integral part of the compass or binnacle and thus to avoid the necessity of providing supports for compensating magnets exterior thereof. For this purpose magnetic means of the type illustrated in my prior application Ser. No. 386,873 may be employed. For completeness however, this magnetic means is illustrated in FIG. 3 and will be briefly described.

Two bar magnets 50 and 52 are provided each having a central enlargement, the enlargement on the magnets being indicated at 54. These magnets are rotatably mounted about a vertical pivot indicated at 56 which may take the form of a screw passing through aligned holes in the enlargement 54 of the bar magnets. With this arrangement the magnets may be adjusted relative to each other to provide a resultant magnetic field of variable strength. Thus, when the north poles of the magnets are in coincidence the magnetic means has a maximum strength. When the north pole of one magnet is coincident with the south pole of the other magnet the effectiveness of the magnetic means is reduced to zero. In the position illustrated the composite magnet has an effective north-south axis indicated at 58 and the strength or effectiveness of the opposite magnet has a value intermediate those resulting when the like poles are in coincidence or opposition.

By loosening the screw 56 the magnets 50 to 52 may be adjusted relative to each other to vary the strength of the field and may be adjusted together as a unit to vary the orientation of the field.

The foregoing diagrammatic description represents a construction which is diagrammatically indicated at 45 in FIG. 1.

The final step is simply the removal of the device 16, leaving the compass fully and completely compensated for the horizontal component of the local field of the vehicle.

The foregoing description has been limited to an embodiment of the invention in which only horizontal components of the fields have been compensated; that is, the earth's magnetic field and the disturbing magnetic field of the vehicle have been considered. It is possible of course to effect a more complete compensating of the compass if the several magnetic fields are sequentially neutralized with attention being given to the vertical as well as to the horizontal components thereof. The principles are exactly the same as previously outlined. However, slightly more elaborate equipment is necessary.

Figure 4:
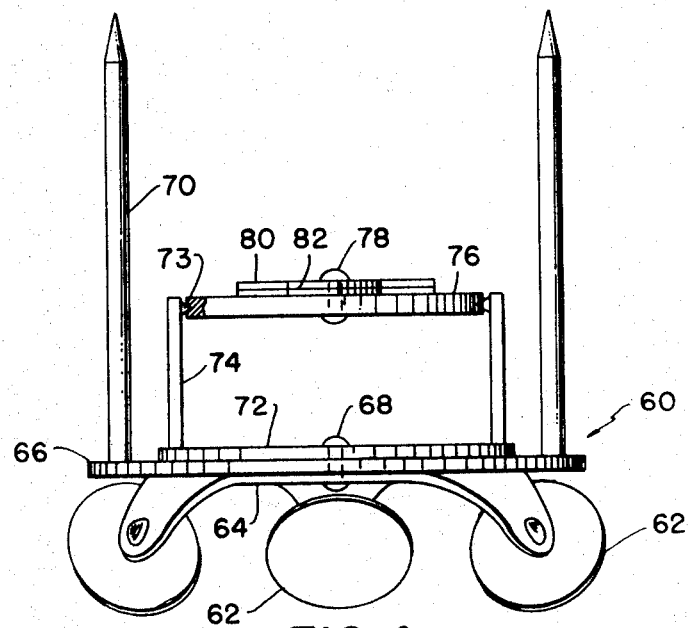
FIG. 4 is an elevational view similar to FIG. 1, showing a different embodiment of the invention.

Referred now to FIG. 4 there is shown a combined orienting and compensating device 60 which as before, may be provided with suction cups 62 for attachment to a dome of a compass case. The device includes a mounting plate 64 to which is pivoted a plate 66 by means of a vertically elongated rivet 68 or the like. The plate 66 at opposite ends includes a pair of aiming posts 70 which may be swung into alignment with a distant object so as to note and record the orientation of the compass on the vehicle. It will of course be appreciated that the pivot means, such as the rivet 68, may be provided with friction means such as a friction washer (not shown) so that while the plate 66 may be turned readily to required position, it will remain in such position against accidental displacement.

Also carried by the rivet 68 for pivotal movement about a vertical axis is a second plate 72 having thereon a pair of posts 74 providing a frictional pivot support 73 for a compensator support plate 76. Mounted on the plate 76 for angular adjustment about a pivot pin or rivet 78 are a pair of magnets indicated at 80 and 82 which may be of the type illustrated in FIG. 3.

With the foregoing construction it will be apparent that the plate 72 may be adjusted angularly about a vertical axis conjointly with adjustment of the magnets 80 and 82 as a unit to bring the magnetic axis of the magnets 80 and 82 into alignment and opposition to the horizontal components of the earth's magnetic field while the horizontal pivot axis of the plate 76 established by the posts 74 is brought into a position perpendicular to the earth's magnetic field. With this adjustment established the individual magnets 80 and 82 may be adjusted in the same manner as the magnets 50 and 52 previously described, and the plate 72 may be adjusted about the horizontal axis established by the pivots 73 until the compass needle or magnet is completely dead both as to horizontal and vertical movement. Of course, if the compass needle is of the type which is responsive only to the horizontal component of the ambient field (as is usual) it will be necessary to measure the dip or inclination of the earth's magnetic field from the horizontal by separate means, such as a dip needle substituted in place of the compass.

It will be understood that the pivot mounting 73 of the plate 76 afforded by the posts 74 may have sufficient friction developed so that the plate 76 will retain any inclination given to it in effecting neutralization of the earth's magnetic field.

Figure 5:
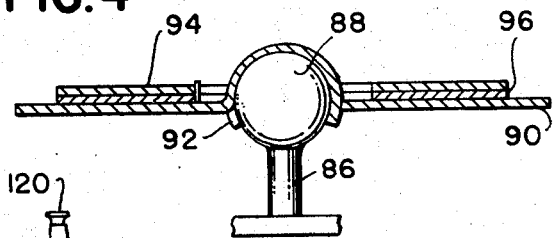
FIG. 5 is an enlarged sectional view of the universal mounting means of magnetic compensating means in the compass.

As in the previous embodiment of the present invention, the compass together with the properly adjusted magnets 80 and 82, is restored to the vehicle in its original orientation as observed by the aiming points 70. Thereafter, magnets which are to provide permanent or long-term compensation of the compass are adjusted as previously described to completely neutralize the magnetic field of the vehicle. Again, it is desirable at this time to neutralize vertical as well as horizontal components of the vehicle and this may be accomplished by providing in the compass or the binnacle which supports the compass, the compensator illustrated in FIG. 5. In this figure there is provided a post 86 having a spherically formed head 88 on which is carried a magnet support plate 90 having a plurality of spring fingers 92 extending down below the diametral plane of the ball or head 88. Conveniently, the fingers 92 may be formed from the material of the plate 90 and are dimensioned so as to provide for limited universal movement of the plate 90 about the center point of the ball and at the same time, the fingers 92 afford substantial friction so that the plate 90, while it may be readily adjusted into a required position, will retain the adjusted position against accidental dislodgement.

Neutralization of the disturbing magnetic field of the vehicle, while the earth's magnetic field remains neutralized by the proper adjustment of the device 60, is accomplished by individually rotating magnets 94 and 96, which correspond to the magnets 50 and 52 of FIG. 3, so as to adjust the strength of the magnetic field. At the same time the magnets 94 and 96 may be adjusted together about the vertical axis of the post 86 relative to the plate 90, or alternatively, the plate 90 may be adjusted as a unit together with the magnets 94 and 96 about the vertical axis of the post 86 to bring the magnetic axis of the magnets 94 and 96 into opposition to the horizontal component of the vehicle's disturbing magnetic field. The plate 90 with the magnets 94 and 96 thereon may also be inclined from the horizontal so as to cause the magnetic axis of the magnets 94 and 96 to have the same inclination from the horizontal as the magnetic field of the vehicle. With proper adjustment made of the structure shown in FIG. 5, the disturbing magnetic field of the permanently or semi-permanently magnetized bodies on the vehicle is completely neutralized and will remain so until there has been a change in the vehicle's magnetic field.

At this time, as before, the device 60 which was used for the purpose of neutralizing the earth's magnetic field, is removed from the compass leaving the compass responsive solely to the earth's magnetic field. It is to be understood that at this time the compass may be of a type responsive only to the horizontal component of the earth's magnetic field or it may have means responsive to dip or vertical declination. In either case, full compensation including compensation of the vertical components of the disturbing magnetic field of the vessel, is useful particularly since when the vehicle or vessel assumes other than a strictly horizontal position such as occurs for example as a result of roll or pitch, uncompensated vertical components of the vessel's magnetic field develop horizontal components which would lead to apparent compass error.

It will be observed that before neutralizing the local field of the vehicle, the rotatable magnetic element 14 of the compass provided an accurate indication of the orientation of this field without any necessity for attempting to analyze vectors in a resultant field.

Not only does the rotatable magnetic element 14 of the compass provide an accurate indication of the orientation of the local field while still subjected to the first magnetic compensating means, but also the sensitivity to the magnetic field is greatly increased. A local magnetic disturbance which would be substantially undetectable by means of a compass subject to the local magnetic field produces a clear cut indication with the present construction.

Figure 7:
FIG. 7 is a fragmentary elevational view in the direction of the arrows 7—7, FIG. 6.
Figure 6:
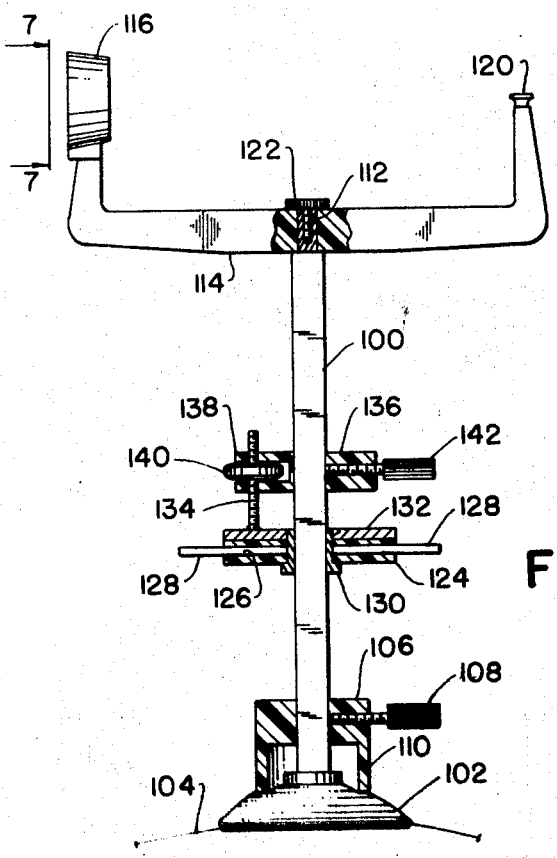
FIG. 6 is an elevational view, partly in section, of a preferred embodiment of the earth field compensating means.

Referring now to FIGS. 6 and 7 there is illustrated a simplified and preferred embodiment of the present invention. The apparatus as seen in these figures comprises a post 100 herein illustrated as being of square cross-section. At its lower end the post is firmly mounted in a suction cup 102 by means of which the apparatus is detachably connected to a compass, a portion of which is illustrated at 104. It will be understood that the portion of the compass 104 may be a portion of a dome or bowl such as seen at 12 in FIG. 1.

In order to stabilize the post when the apparatus is mounted on a compass there is provided a stabilizer 106 which is vertically slidable on the post 100 and which may be clamped in adjusted position thereon by means of a set screw 108. After the suction cup 102 is operated to attach the apparatus to the bowl of the compass the stabilizer 106 is pressed downwardly to the position illustrated in FIG. 6. The stabilizer includes a downwardly extending annular flange 110 which is adapted to engage the upper surface of the suction cup at a point substantially removed from the vertical center-line of the post 100. When the stabilizer is moved downwardly to the position shown in firm contact with the suction cup, as evidenced by some deformation or embedding of the lower edge of the flange 110 into the material of the suction cup, it operates to provide greatly increased stability to the post 100 and the structure carried thereby.

At its upper end the post is reduced to provide a stud 112 of circular cross-section on which is mounted an aiming device 114 having a disc 116 provided with the equivalent of cross hairs 118 in association with a sighting element 120. The sighting element 120 and disc 116 are substantially separated as shown. The device 114 is rotatable about the stud 112 and may be clamped in adjusted position by a clamping screw 122.

Vertically movable on the post 100 is a magnet support disc 124 having two diametrically opposed recesses 126 adapted to receive elongated magnets 128. The disc 124 is rotatable on a sleeve 130 which is formed of magnetic material to complete a flux path between the adjacent ends of the magnets 128. Fixed to the upper end of the sleeve 130 is a disc 132 formed of non-magnetic metal and having fixedly secured thereto an upwardly extending threaded adjustment screw 134.

Slidable on the post 100 is a block 136 having a pair of vertically spaced arms 138 between which is located an adjusting nut 140, the nut being threaded to the screw 134. The block 136, together with the disc 124 and disc 132, may be vertically adjusted into approximately required position by loosening a set screw 142, after which the set screw is operated to lock the block 136 to the post. Thereafter, fine adjustment of the disc 124 and the magnets 128 carried thereby is effected by rotation of the nut 140. All of the components of the compensating apparatus shown in FIG. 6 with the exception of the magnets 128 and the sleeve 130 are formed of non-magnetic material.

The present method and apparatus enables quick accurate and easy compass compensation. Moreover, the accuracy of the compensation is especially great, a fact undoubtedly attributable to the sequential steps of neutralizing the earth's magnetic field by a first magnetic compensating device and thereafter neutralizing the remaining magnetic field or the local magnetic field by a second magnetic compensating device, and finally removing the first magnetic compensating device to leave the compass fully compensated for the disturbing influence of the local field. It will be understood that the requirement of subjecting the compass solely to the earth's magnetic field during the initial compensation by device 16 may be satisfied by adjusting the magnetic means 45 to zero effectiveness, or providing the means 45 in a binnacle or compass support rather than in the compass proper.

What I claim as my invention is:

1. The method of compensating a magnetic compass for use on a vehicle having a local magnetic field which comprises neutralizing the horizontal component of the earth's magnetic field, neutralizing the vertical component of the earth's magnetic field while neutralizing its horizontal component, thereafter neutralizing the horizontal component of the local field and neutralizing the vertical component of the local magnetic field while neutralizing its horizontal component, and finally, terminating the neutralization of the earth's magnetic field to leave the magnetic compass under the influence solely of the earth's magnetic field.

2. The method as defined in claim 1 which comprises the step of neutralizing the horizontal and vertical components of the earth's magnetic field by removing the compass from a location subject to a local magnetic field to a location in which it is subjected substantially solely to the influence of the earth's magnetic field and in such location neutralizing the horizontal and vertical components of the earth's magnetic field by the adjustment of first magnetic means relative to the compass.

3. The method a defined in claim 2 in which the step of neutralizing the horizontal and vertical components of the local field comprises restoring the compass to the original location and orientation in which it is subject to the influence of the local magnetic field while still subjected to the influence of the first magnetic means, and thereafter neutralizing the horizontal and vertical components of the local magnetic field by adjustment of second magnetic means independent of said first magnetic means.

4. Apparatus for compensating a magnetic compass having a rotatable magnetic element and adjustable magnetic compensating means associated with said compass during normal use thereof, said apparatus having means for detachably connecting it to the magnetic compass, said apparatus including a magnet support, magnetic means on said support, means for adjusting said magnetic means about a vertical axis to position the poles of the magnetic means in opposition to the earth's magnetic field, and means to vary the effectiveness of said magnetic means on the rotatable magnetic element of the compass, said compensating means being adapted to be rendered ineffective on said compass by separation therefrom or otherwise during compensation by said compensating apparatus, said apparatus comprising a post, suction cup means for attaching said post to the compass, a magnet support rotatable on said post, said support having diametrically opposed recesses to receive elongated magnets therein, and a sleeve in said support slidably adjustable on said post and formed of magnetic material and closing the inner ends of said recesses and forming a flux path for magnets in said recesses and in contact with said sleeve, all other parts of said apparatus being formed of non-magnetic material.

5. Apparatus as defined in claim 4 in which said suction cup means comprises a single suction cup centered at the bottom of said post and a stabilizer slidable vertically on said post and having an annular bottom surface engageable with the upper surface of said cup at a circular zone spaced substantially from the center line of said post, and means for clamping said stabilizer to said post in adjusted position thereon.

6. The method of compensating a magnetic compass for use on a vehicle having a local magnetic field causing semi-circular deviation without substantial quadrantal deviation, the compass having associated therewith magnetic compensating means adjustable as to strength and azimuth, which comprises, maintaining the vehicle on a single heading throughout the entire compensation, removing the compass from the vehicle to a location where it is subject to the magnetic influence solely of the earth's magnetic field, orienting the compass to the orientation it had on the vehicle, temporarily attaching to the compass a magnetic device adjustable about a vertical axis to adjust the direction of the north-south field direction thereof, and further adjustable to vary the strength of its magnetic field, adjusting the direction and strength of the magnetic field of the device of neutralize the horizontal component of the earth's magnetic field, with the device still attached to the compass and adjusted as aforesaid restoring the compass to the vehicle at its original orientation thereon, thereafter adjusting the magnetic compensating means associated with the compass as to strength and direction of its magnetic field to determine the adjustment thereof which will neutralize the effect of the vehicle's local field and hence render the compass responsive to no magnetic field while the said device remains attached thereto, and finally removing the device to leave the compass under the influence solely of the earth's magnetic field.

7. Apparatus for eliminating the effect of the earth's magnetic field on a compass comprising a single vertical post having at least an intermediate portion of uniform cross-section and smooth surface, a base for supporting said post on a compass centrally above the pivot axis of the compass needle, a block freely slidable on the post, a set screw carried by said block and engageable with said post to clamp the block in fixed position, a body spaced longitudinally from said block and slidable on said post, threaded adjusting means interconnecting said block and body, and a rotatable magnet support carried by said body and angularly adjustable thereon about the axis of said post.

8. Apparatus as defined in claim 7 comprising a sleeve on said block surrounding said post, said magnet support having oppositely extending openings, magnets in said openings having their inner ends in contact with said sleeve, said sleeve being formed of magnetic material, said post, said block, said body and said magnet support being formed of non-magnetic material.

9. Apparatus as defined in claim 8 in which said block, said body, and said post comprise means to prevent rotation of said block and said body on said post.

10. Apparatus as defined in claim 7, in which said magnets are elongated and extend radially outwardly of the openings in said magnet support in diametrically opposed relation to provide a visual indication of the north-south direction of the magnetic field which results from said magnets.

11. The method of compensating a magnetic compass for use on a vehicle having a local magnetic field causing both semi-circular and quadrantal deviation, the compass having associated therewith magnetic compensating means adjustable as to strength and azimuth, which comprises, maintaining the vehicle substantially on a single cardinal heading throughout the entire compensation, removing the compass from the vehicle to a location where it is subject to the magnetic influence solely of the earth's magnetic field, orienting the compass to the orientation it had on the vehicle, temporarily attaching to the compass a magnetic device adjustable about a vertical axis to adjust the direction of the north-south field direction thereof, and further adjustable to vary the strength of its magnetic field, adjusting the direction and strength of the magnetic field of the device to neutralize the horizontal component of the earth's magnetic field, with the device still attached to the compass and adjusted as aforesaid restoring the compass to the vehicle at its original orientation thereon, thereafter adjusting the magnetic compensating means associated with the compass as to strength and direction of its magnetic field to determine the adjustment thereof which will neutralize the effect of the vehicle's local field and hence render the compass responsive to no magnetic field while the said device remains attached thereto, and finally removing the device to leave the compass under the influence solely of the earth's magnetic field.

References Cited

UNITED STATES PATENTS

| 2,507,933 | 5/1950 | Rasmussen | 73—1 |
| 2,909,846 | 10/1959 | Bellon | 33—225 |
| 3,418,840 | 12/1968 | Wallace | 73—1 |

FOREIGN PATENTS

| 598,751 | 2/1948 | Great Britain. |
| 624,083 | 5/1949 | Great Britain. |
| 934,900 | 1/1948 | France. |

S. CLEMENT SWISHER, Primary Examiner

U.S. Cl. X.R.

33—225